(12) United States Patent
DeCusatis et al.

(10) Patent No.: US 7,444,079 B2
(45) Date of Patent: *Oct. 28, 2008

(54) OPTICAL POWER CONTROL MONITOR FOR MULTIPLE WAVELENGTH FIBER-OPTIC NETWORKS

(75) Inventors: Casimer M. DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 568 days.

This patent is subject to a terminal disclaimer.

(21) Appl. No.: 09/976,725

(22) Filed: Oct. 12, 2001

(65) Prior Publication Data

US 2003/0072054 A1 Apr. 17, 2003

(51) Int. Cl.
*H04J 14/02* (2006.01)
(52) U.S. Cl. .............................. 398/93; 398/94; 398/95; 398/83
(58) Field of Classification Search .................... 398/79, 398/83–85, 93–95
See application file for complete search history.

(56) References Cited

U.S. PATENT DOCUMENTS

| 5,513,029 | A | * | 4/1996 | Roberts | 398/32 |
| 5,777,773 | A | * | 7/1998 | Epworth et al. | 398/185 |
| 6,208,441 | B1 | * | 3/2001 | Jones et al. | 398/87 |
| 2002/0015201 | A1 | * | 2/2002 | Zhou et al. | 359/124 |
| 2003/0058510 | A1 | * | 3/2003 | Jacobowitz et al. | 359/187 |
| 2003/0067646 | A1 | * | 4/2003 | Wan et al. | 359/124 |

OTHER PUBLICATIONS

Bann, R., et al., "Micromachining system accommodates large wafers," Laser Focus World, www.optoelectronics-world.com, pp. 189-192, Jan. 2001.
Kartalopoulos, S., "Introduction to DWDM Technology Data in a Rainbow," IEEE, Chapter 3, pp. 67-68, (1999).
Carroll, J., et al., "Distributed feedback semiconductor lasers," IEE Circuits, Devices and Systems Series 10, SPIE Press Monograph, vol. PM52, pp. 9-15, (1998).

* cited by examiner

*Primary Examiner*—Jason Chan
*Assistant Examiner*—Nathan M. Curs
(74) *Attorney, Agent, or Firm*—Scully, Scott, Murphy & Presser, P.C.; Lisa U. Jaklitsch, Esq.

(57) ABSTRACT

An optical control monitor and a method for adjusting for changes in optical signals transmitted through an optical network. The method comprises the steps of transmitting a set of optical signals through a network, each of the optical signals having a respective wavelength; and tracking changes to said set of signals by passing each of the signals through a filter having a bandpass function, and dithering the filter bandpass about the wavelengths of each of said set of signals to generate filter output signals. The filter output signals are used to adjust the network or the set of optical signals to compensate for said changes.

20 Claims, 11 Drawing Sheets

OPTICAL POWER CONTROL MONITOR FOR MULTIPLE WAVELENGTH FIBER-OPTIC NETWORKS

BACKGROUND OF THE INVENTION

1. Field of the Invention

This invention generally relates to fiber optic networks, and more specifically, the invention relates to fiber optic networks that carry multiple optical signals at multiple wavelengths. Even more specifically, the invention relates to methods for, and to a monitor for, compensating for changes in the signals of such fiber optic systems.

2. Prior Art

The Internet-driven bandwidth demand explosion has accelerated the introduction of wavelength division multiplexing and photonic components for optical networks, evolving from long-haul telecom "core" and "edge" to the shorter distance "Acess" and metropolitan segments with differing requirements for lower cost and multiple protocols and or businesses sharing the optical spectrum. The long-haul application requires multiple optical amplifiers, while the short-haul requires bandwidth provisioning management.

Fiber optic dense wavelength division multiplexing (DWDM) systems have also found increasing applications in metropolitan area datacom networks (MANs). The DWDM equipment is often combined with optical repeaters, amplifiers, switches, and other networking elements. This creates a fundamental problem, in that wavelength channels cannot be added or dropped from the fiber link without impacting all of the remaining channels in the network. For example, in a 32 wavelength DWDM system, the optical power launched by each wavelength tuned laser is not equal, and furthermore each wavelength experiences different optical attenuation as it passes through the network elements (these include wavelength add/drop filters, optical amplifiers, interconnect switches, etc.). In other words, the optical transfer function (OTF) of a DWDM network is not constant over wavelength; it varies significantly depending on the number of wavelengths in use at a given time. Adding or dropping one or more wavelengths requires that the rest of the network be adjusted to compensate for the change in optical power; failure to do this may give rise to nonlinear optical effects or impact the link budget and target bit error rate of the system.

All optical networks encode the information to be transmitted and received. A stable optical power level ("D.C.") is vital to set and maintain the code's threshold for digital data: above the threshold is a "one" and below the threshold is a "zero." Bouncing this code-threshold value results in bit errors, corrupted data, and, frequently, uncontrolled quality of service (QoS) as header-addresses for information packets are lost. A stable optical power threshold for lightwave communication is, therefore, essential to optical network operation.

To address this problem, various schemes have been proposed to design optical control modules (OCMs) which compensate for the nonuniform OTF of the network. As a simple example, part of the optical power at each wavelength may be sampled using an optical splitter and detector, with the resulting control signal fed back to adjust equalizers in the optical amps or laser transmitter power in the DWDM equipment. The accuracy of these systems is often poor, and the implementation cost can be high for many wavelengths with dense spacing.

SUMMARY OF THE INVENTION

An object of this invention is to automatically compensate for changes in the optical signals of multiple wavelength optical networks.

Another object of the present invention is to design an optical control monitor, for a multiple wavelength fiber-optic network, based on a dither feedback mechanism which uses optical filters that are already part of the network for add/drop functions.

A further object of the invention is to track changes in a fiber-optic network when wavelengths are added or dropped, and to use a feedback signal to compensate for those changes.

These and other objectives are attained with an optical control monitor and a method for adjusting for changes in optical signals transmitted through an optical network. The method comprises the steps of transmitting a set of optical signals through a network, each of the optical signals having a respective wavelength; and tracking changes to said set of signals by passing each of the signals through a filter having a bandpass function, and dithering the filter bandpass about the wavelengths of each of said set of signals to generate filter output signals. The filter output signals are used to adjust the network or the set of optical signals to compensate for said changes.

The preferred implementation of the invention employs a dither feedback mechanism which uses optical filters that are already part of the network for add/drop functions. The basic principle involves dithering the optical filter bandpass about the center wavelength of each DWDM channel in use; this yields a measurement of the OTF in the network at any instant in real time. When the network configuration is changed by adding or dropping wavelengths, the resulting change in the OTF can be tracked and feedback signals are used to compensate for the change.

There are many possible compensation schemes; the most commonly used today is based on average optical power in the DWDM fibers, since it is relatively simple to implement. The approach of this invention offers the ability to go beyond this method, and implement more accurate OCMs based on the spectral power density in the DWDM fiber. Previously, this was only possible using prohibitively expensive optical spectrum analyzer equipment in the DWDM network, and even then there was no practical feedback control loop which could adjust the network response functions quickly enough to be of any practical use. The present invention, based on a wavelength locked loop, allows a spectral decomposition (optical power vs. wavelength) with very fast response corrections and hence enables the use of networks with more wavelengths spaced more closely together at a specified bit-error rate (BER).

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
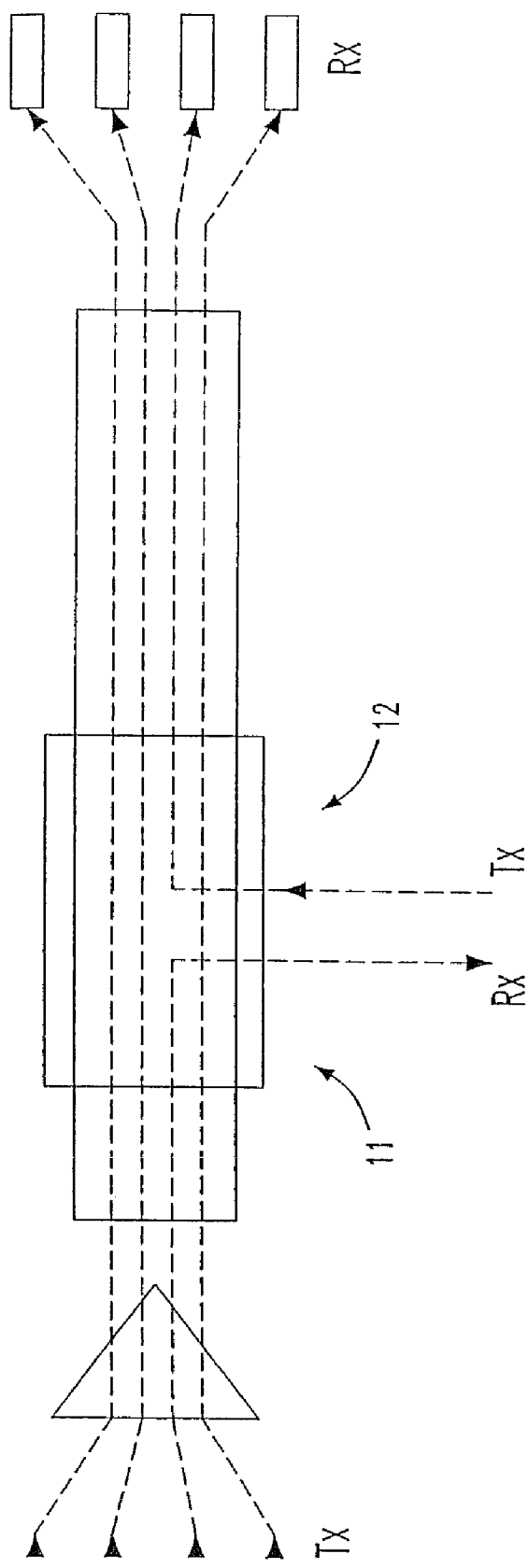
FIGS. 1 and 2 illustrate the concept of optical add/drop multiplexing in a DWDM network.
Figure 2:
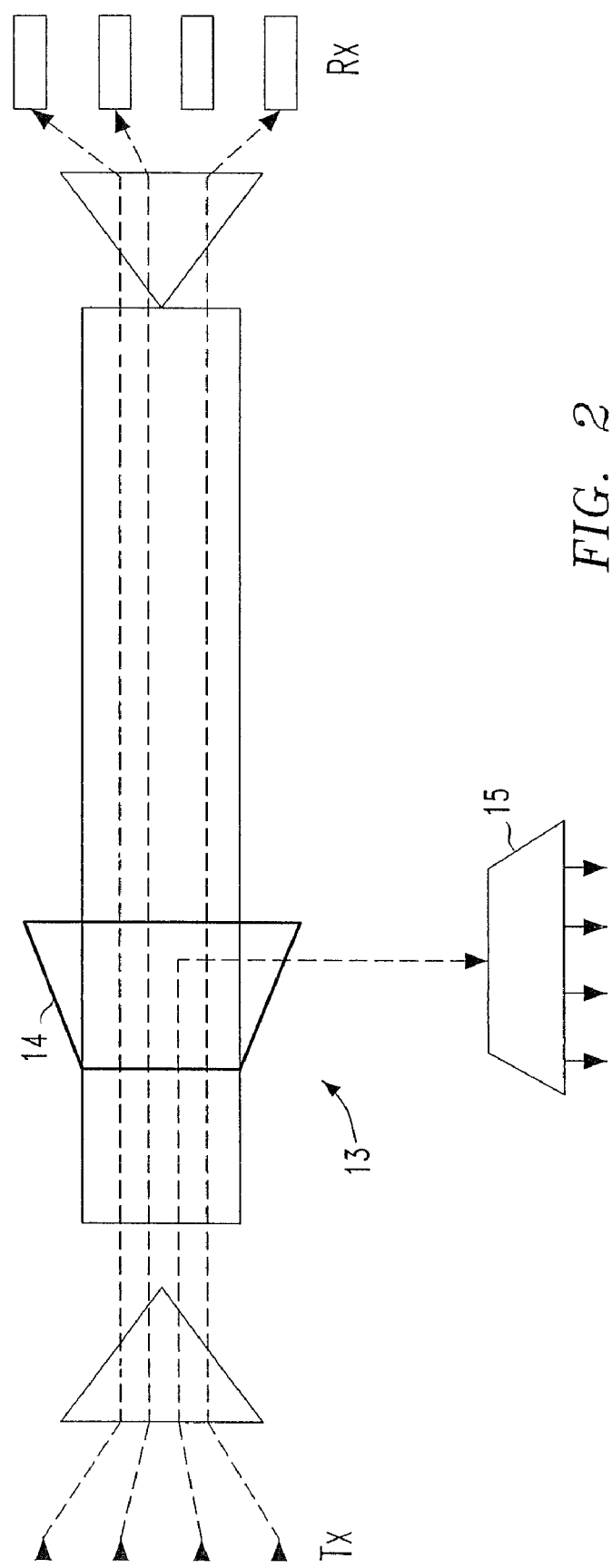

FIGS. 1 and 2 show the concept of optical add/drop multiplexing (OADM) in a DWDM network; true add/drop multiplexing implies the signal is dropped first, then added back into the network. More specifically, in FIG. 1, a channel is being dropped at 11, and is being added at 12. In FIG. 2, a channel is being dropped at 13, via add drop filter 14, and the dropped channel is directed to demutliplexer 15.

Figure 3:
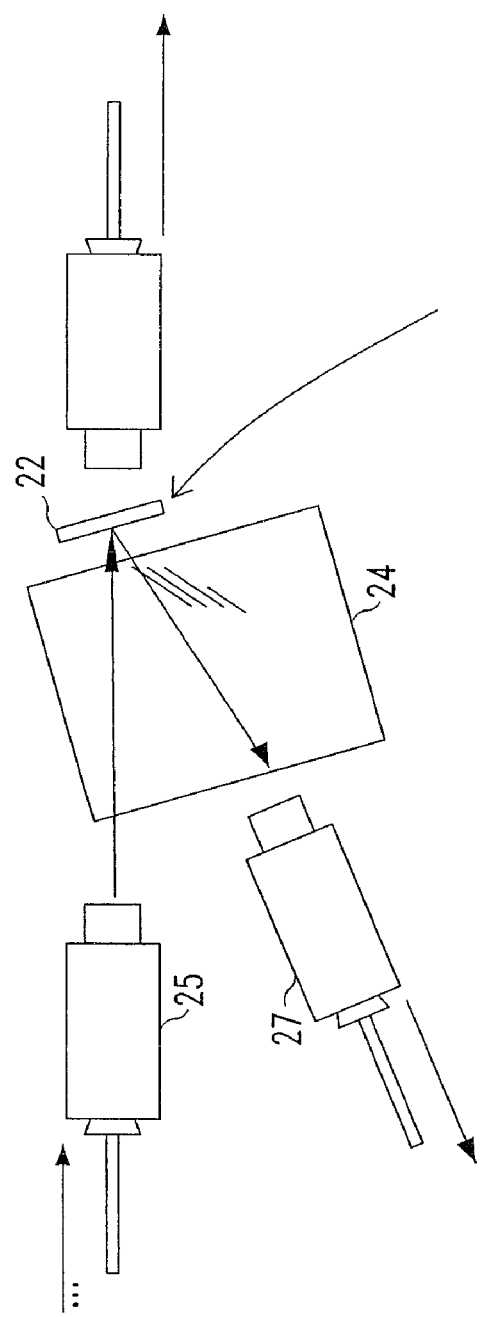
FIG. 3 shows an interference filter that may be used to add or drop selected wavelengths.

With reference to FIG. 3, the add/drop may be accomplished by thin-film interference filters 22 on a glass substrate 24, with their passband adjusted to match the operating wavelengths. In the apparatus shown in FIG. 2, graded index lens 25 separates the wavelength groups $\lambda 1, \lambda 2, \lambda 3, \ldots$ . The "dielectric" or "thin film" filter 22 parses only the selected wavelength, all other wavelengths are reflected and multiplexed. In this way, $\lambda 1, \lambda 2, \lambda 3, \ldots$, are reflected through graded index lens 27.

Figure 4:
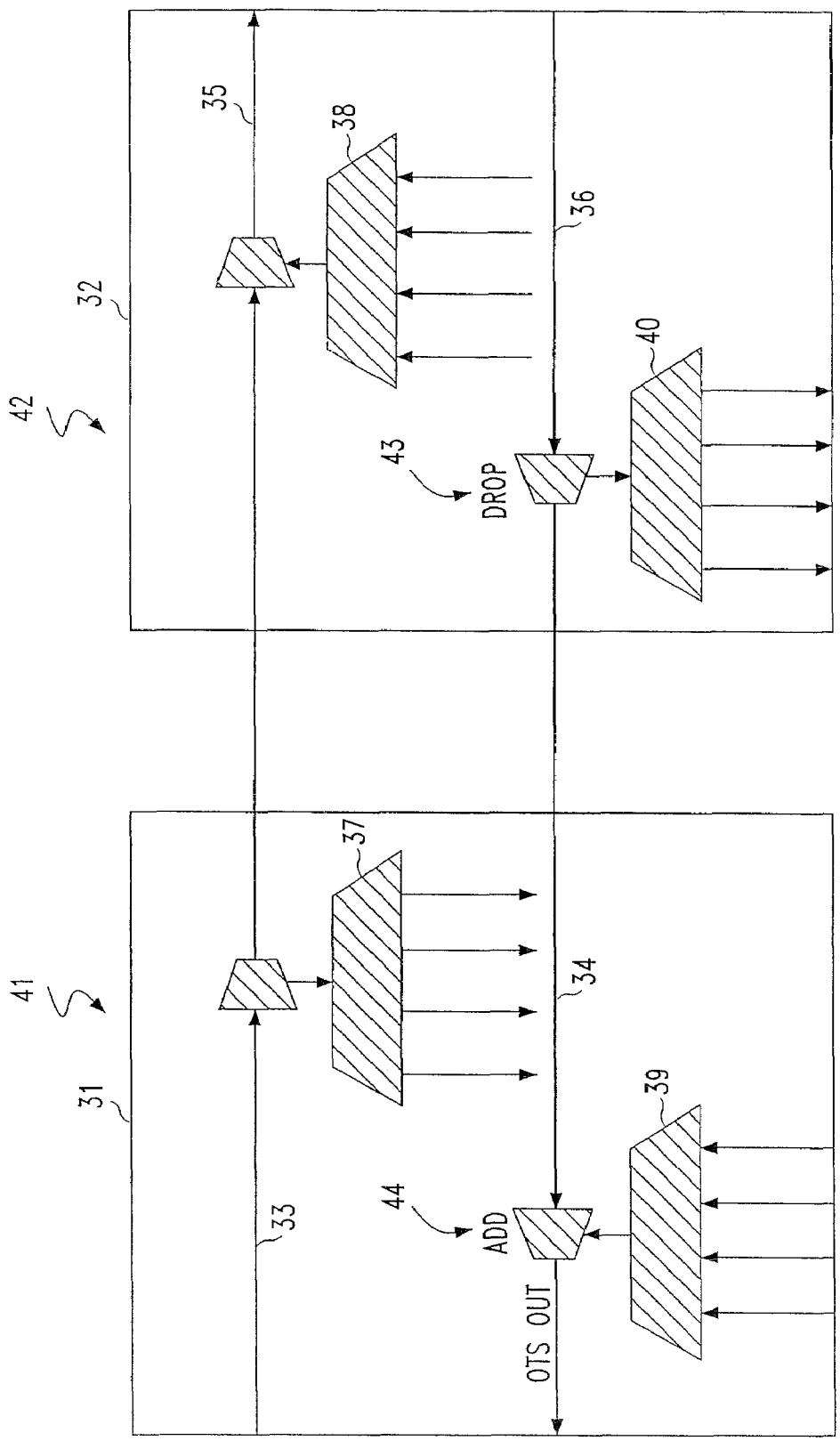
FIG. 4 shows how channels may be added and dropped from a duplex link.

As illustrated in FIG. 4, in a duplex link 30, channels are added or dropped in each direction (east and west) using separate filter banks, as shown. More particularly, FIG. 4 illustrates data flow through a shelf (hubbed-ring), and shows OMX modules 31 and 32, west fiber connections 33 and 34, east fiber connections 35 and 36, and multiplexers 37, 38, 39 and 40. A channel is dropped, at 41, from west fiber connection 33 and a channel is added, at 42, at east fiber connection 35. Also, a channel is dropped, at 43, from east fiber connection 36, and a channel is added, at 44, at west fiber connection 34.

Figure 5:
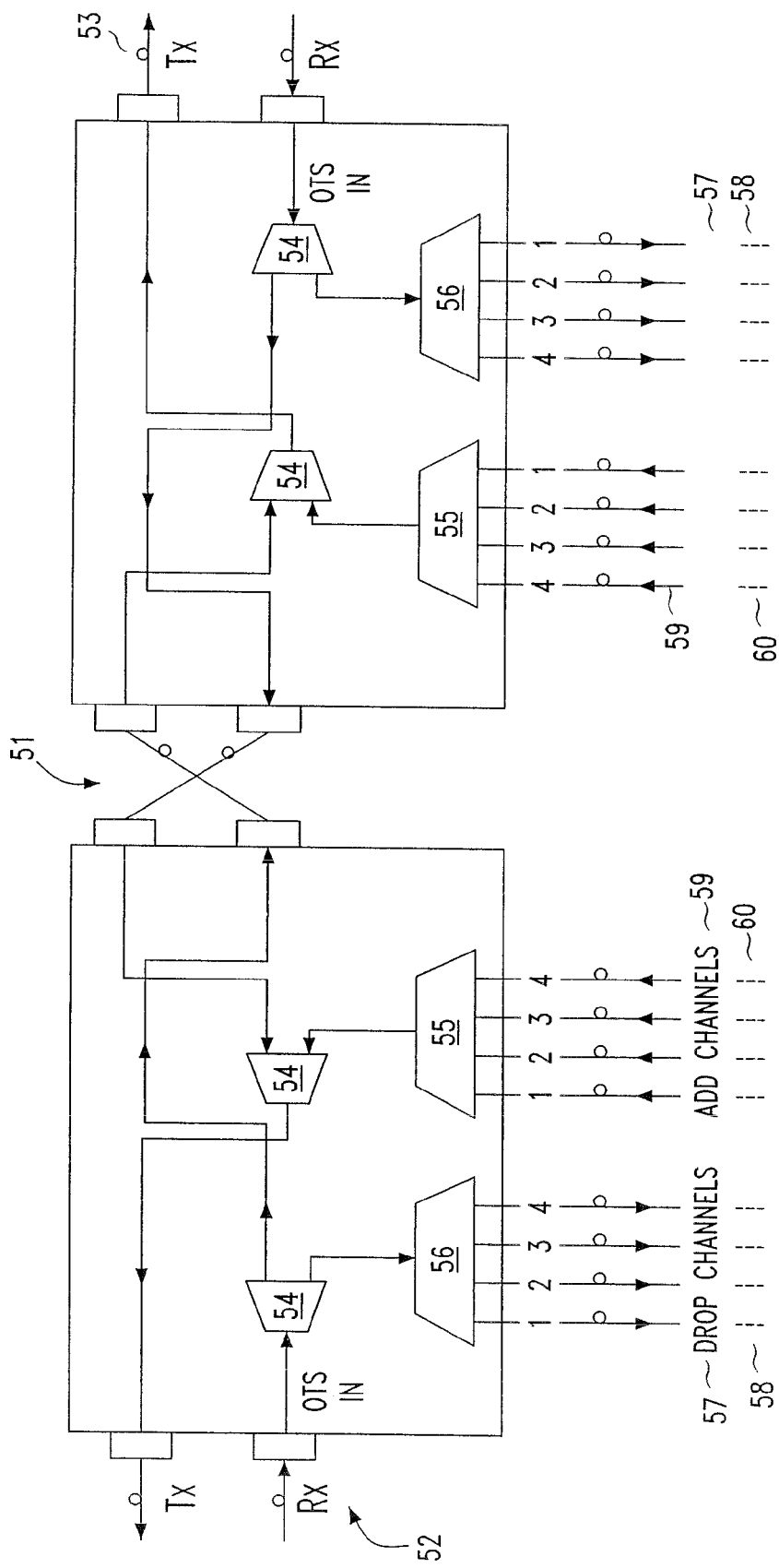
FIGS. 5 and 6 provide additional examples of how channels may be added and dropped from optical networks.
Figure 6:
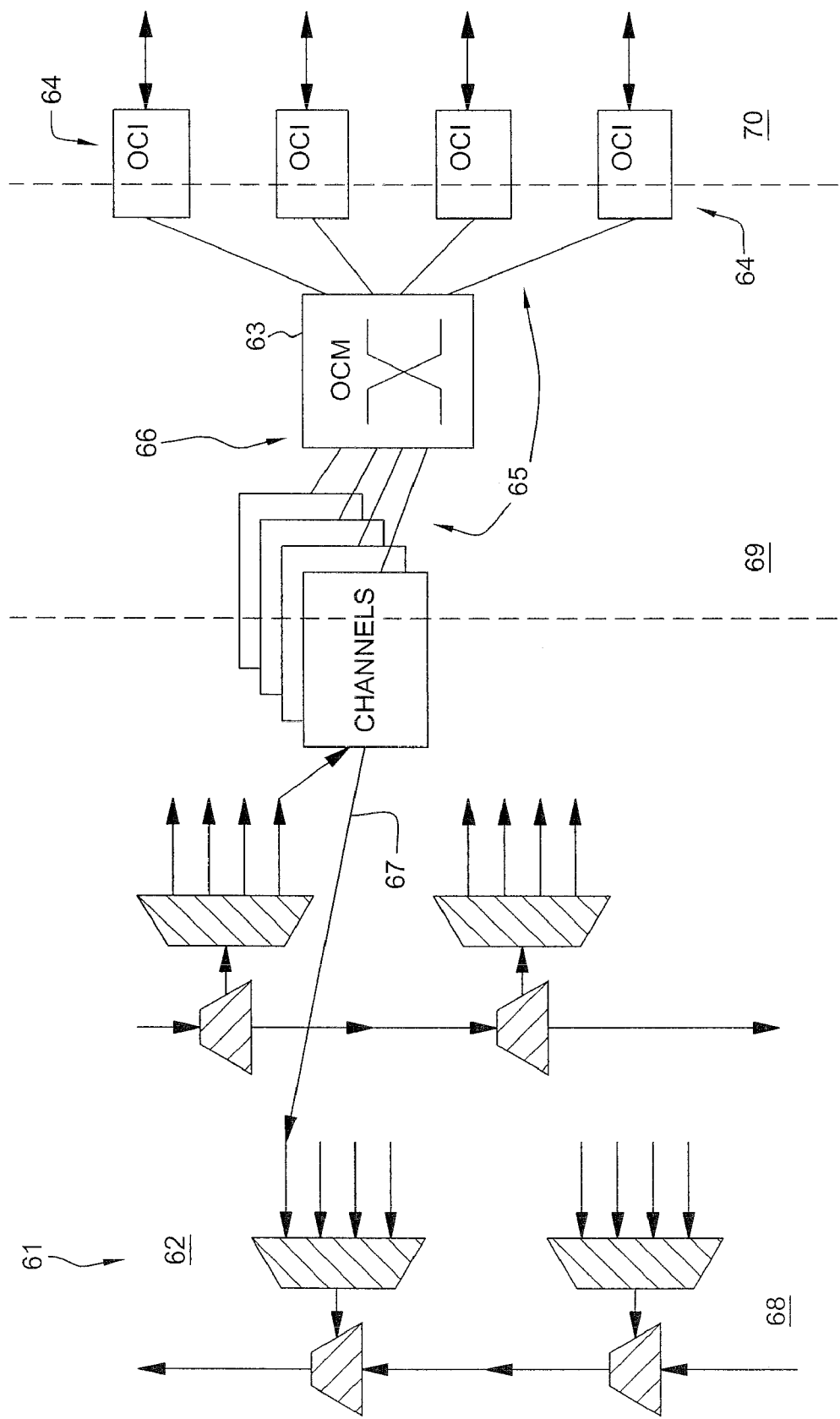

FIGS. 5 and 6 also show examples of how add/drop may be done, and how an OMX card maybe interconnected with the rest of the system to realize a practical DWDM network. In particular, FIG. 5 shows optical multiplexer (OMX) functions in a hubbed ring. Patchcords 51 are provided between OMX modules in a remote shelf. A fiber plant west is represented at 52, and a fiber plant east is represented at 53. Band add/drop filters (ADFs) are presented at 54, channel multiplexers are shown at 55, and channel demultiplexers are shown at 56. Drop channels are represented at 57, and there may be conducted by fiber pigtails 58 to an optical card for laser detector (OCLD). Add channels are represented at 59, and there may be conducted by fiber pigtails 60 to an OCLD card.

FIG. 6 represents a fiber trunk (2-fibers) at 61, OMX cards at 62, optical channel monitor (OCM) at 63, and optical channel interfaces (OCIs) at 64. The output from the OCIs are conducted to user equipment. Also in FIG. 6, 65 represents the backplane, 66 represents the crosspoint switch, and 67 represents the possible location of 0CM invention parts. The architecture shown in FIG. 6 includes an optical domain (passive) 68, the electrical domain 69, and an optical domain 70.

Figure 7:
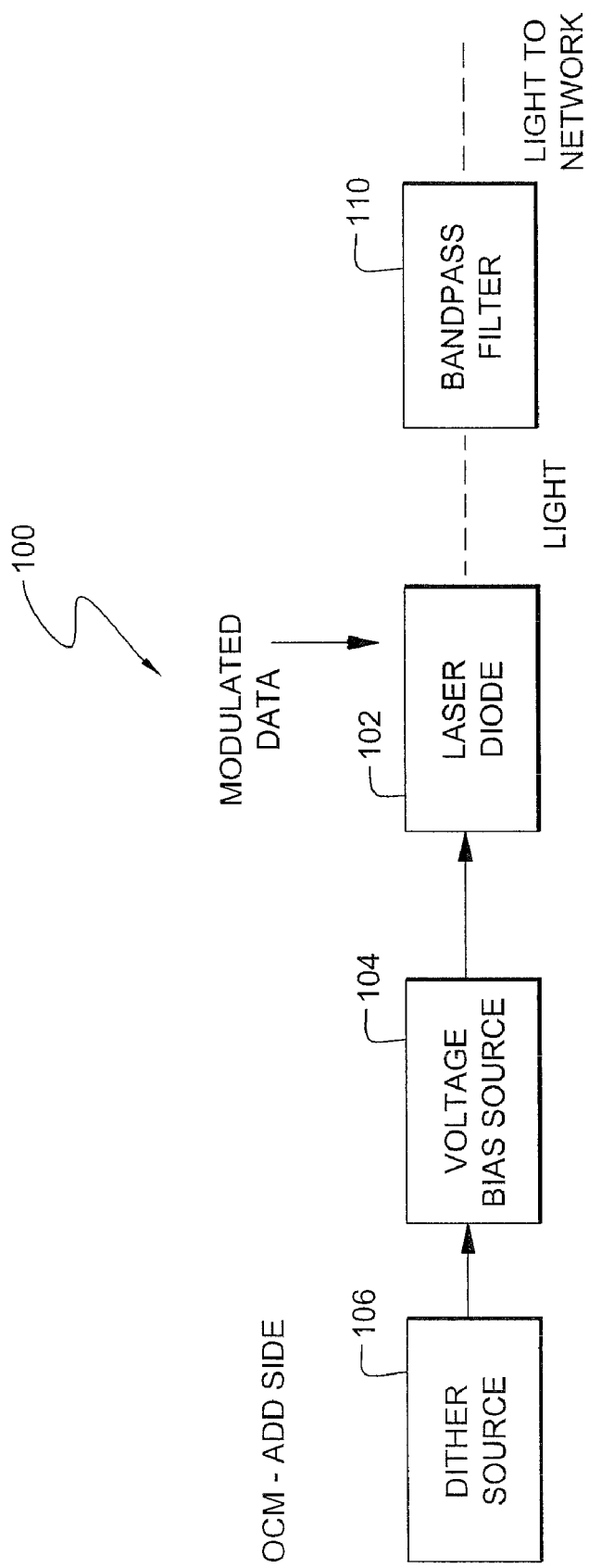
FIG. 7 is a block diagram of a multiplexing add filter input that may be used in the practice of this invention.
Figure 8:
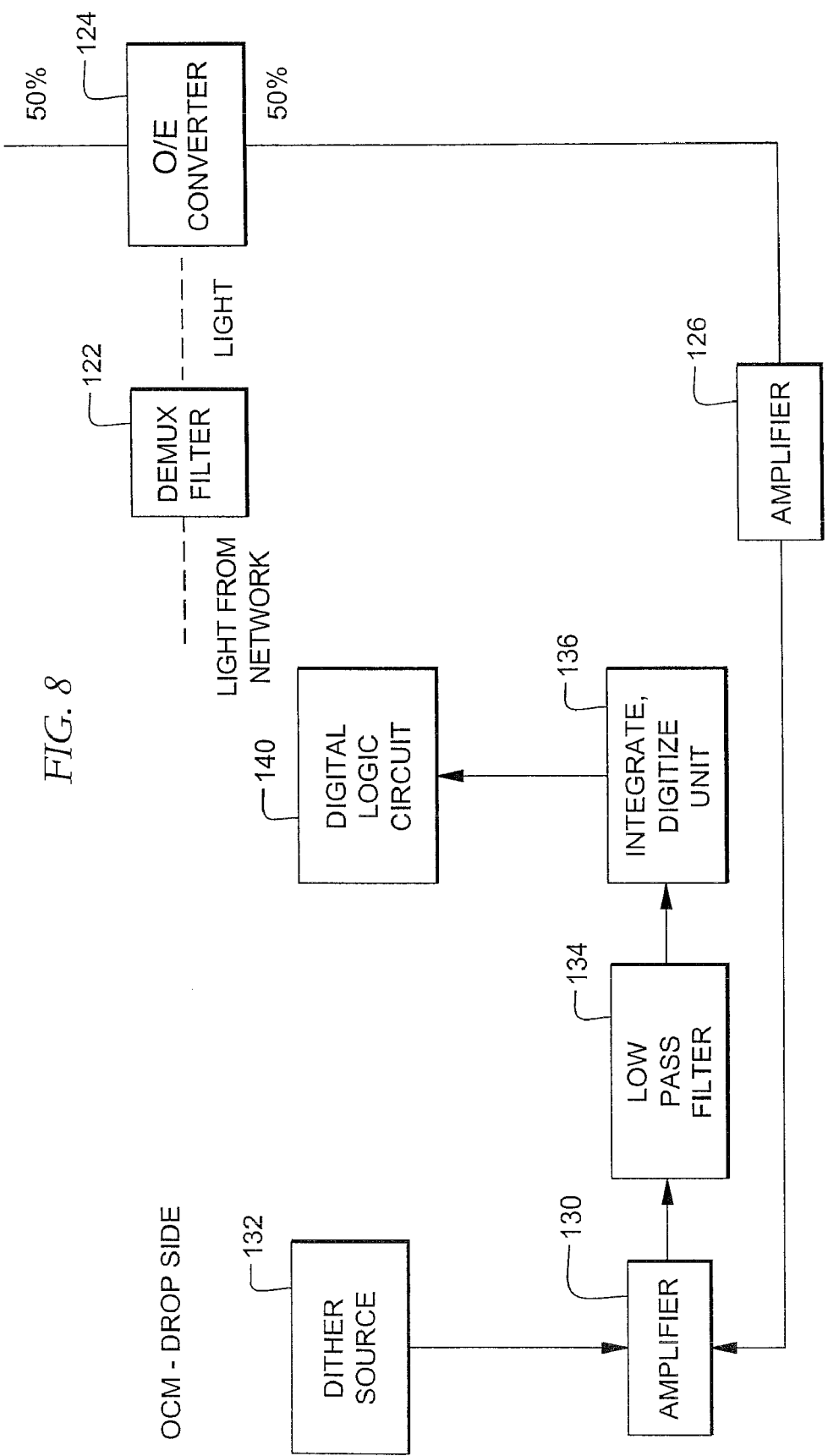
FIG. 8 is a block diagram of a control monitor embodying aspects of the invention.

The preferred embodiment of the present invention is comprised of two parts: one, shown in FIG. 7, is the multiplexing add filter input, and another, shown in FIG. 8, is inserted in the path after the multiplexing filter and, preferably, on the same card/package as the optical to electrical conversion (photodetectors).

With reference to FIG. 7, the system 100 shown therein includes a DWDM laser diode 102 controlled from voltage bias source 104. System 100 further includes sinusoidal dither source 106 and bandpass filter 110. When an optical signal is added to the network, the input signal is modulated with a dither signal imposed on the same wavelength as the data but at a much lower rate that will not interfere with operation of the system (a few kHz to a few MHz is sufficient). This induces a corresponding dither modulation in the optical wavelength of the light source used to add data into the network. The signal passes through the multiplexing add filter 110 and into the DWDM network.

With reference to FIG. 8, when the wavelength is eventually dropped from the network, it passes through a demultiplexing filter 122 and into a photodetector or optical to electrical converter 124. The electrical signal from the detector is split along 2 paths; one carries data to the system output, another carries the data and dither modulation to the OCM. For example, the signal from the detector may be split equally between these two paths. The detector's electrical output signal is amplified by amplifier 126 and fed back to the OCM, where it is multiplied, by multiplier 130, by the same dither frequency, from a suitable dither source 132, used at the transmission end (in practice, each wavelength would preferably have a unique dither frequency). This generates the cross-product of the two signals; and this cross product signal is then passed through low pass filter 134 and integrate, digitize unit 136. By low pass filtering the result to remove higher order terms, then integrating and digitizing the result, we obtain a signal which is proportional to both the magnitude and direction of the offset between the laser center wavelength and the multiplexer passband. Elements that may be used in the above-described feedback loop are described in greater detail in copending application No. 09/865,256, for "Apparatus and Method for Wavelength-Locked Loop for Systems and Applications Employing Electromagnetic Signals," filed May 22, 2001, the disclosure of which is hereby incorporated herein in its entirety by reference.

Since the demultiplexing filter 122 response is known beforehand, this information may be used in a digital logic circuit 140 to calculate the laser center wavelength. In this manner, the 0CM functions as a very inexpensive real time optical spectrum analyzer. The spectrum of the entire DWDM network (all wavelengths) can be generated in this manner in real time as signals are added and dropped; the effect of adding or dropping a wavelength on the other wavelengths in the system is immediately known.

This allows the DWDM equipment to compensate for the change using a variety of schemes. For example, at the transmit or add side, the optical power or wavelength of the remaining wavelengths may be changed to compensate; at the receive or drop side, the receiver voltage bias may be changed to affect receiver sensitivity or the receiver's electrical bandwidth may be adjusted. Alternately, there may be electrical feedback between the drop and add sides in a single DWDM location. It may only be necessary to adjust a few of the wavelengths near the added or dropped wavelength to compensate for effects in the network, and this can be done without communicating to other DWDM add/drop locations. An important feature of the preferred embodiment is that the OCM uses existing filters already in the DWDM network; as additional filters are built into the network, the OCM scales with this approach and can be used with an arbitrary number of wavelengths. Alternative types of spectral filters, such as waveguide Bragg gratings and fiber Bragg gratings are equivalently compatible with methods of the present invention.

The novel servo-control system, implementing a principle referred to herein as the "wavelength-locked loop" or "lambda-locked loop" (since the symbol lambda is commonly used to denote wavelength), may also be used to compensate for changes in the optical make-up or power level of the DWDM network. The basic operating principle of the wavelength-locked loop (WLL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Particularly, as described in commonly-owned, co-pending U.S. patent application Ser. No. 09/865,256, and with reference to FIG. 9, the wavelength-locked loop principle implements a dither modulation to continuously adjust an electromagnetic signal source characterized as having a peaked frequency spectrum or peaked center wavelength, e.g., a laser light source, so as to track the center of a frequency selective device, e.g. a filter passband. In this manner, optimal power of the signal is transmitted and optimal use is made of the system transmission bandwidth. The principle may be exploited for tuning any light source having a peaked frequency spectrum, and additionally, may be used to tune or adjust transmission properties of frequency selective devices such as tunable filters.

Figure 9:
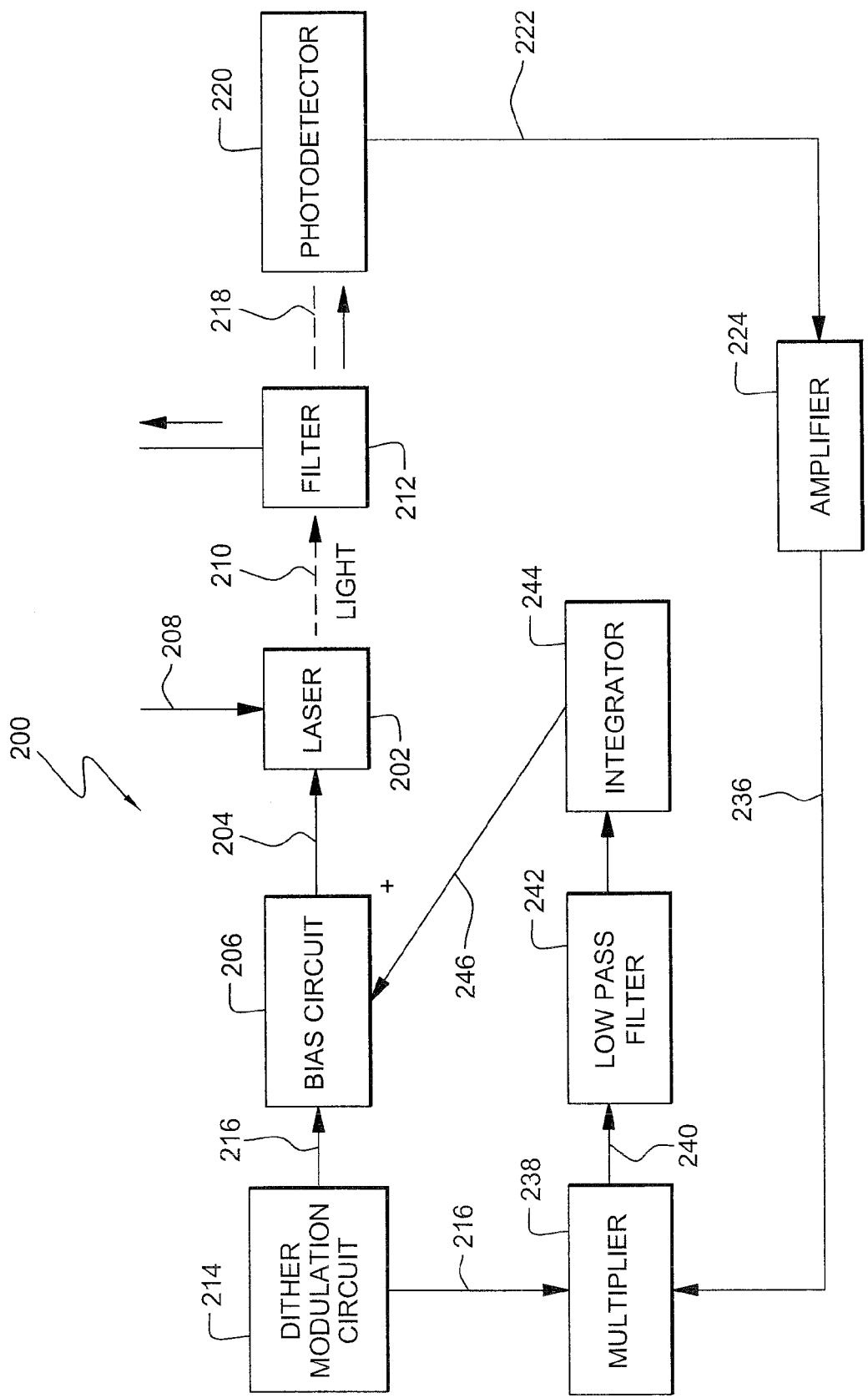
FIGS. 9 and 10 depict examples of wavelength-locked loop system architectures that may be used in the practice of this invention.

For purposes of description, the basic operating principle of the WLL is shown in FIG. 9, which depicts an example optic system 200 including a light source such as laser diode 202 driven with both a bias voltage 204 from a voltage bias circuit 206, and modulated data 208 from a data source (not shown). The laser diode generates an optical (laser light) signal 210 that is received by a bandpass filter 212 or, any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range.

As mentioned, the bandpass filter may comprise a thin film interference filter comprising multiple layers of alternating refractive indices on a transparent substrate, e.g., glass. As further shown in FIG. 9, according to the invention, there is an added sinusoidal dither modulation circuit or oscillator 214 for generating a sinusoidal dither modulation signal 216 that modulates the laser bias voltage. The sinusoidal dither signal may be electronically produced, e.g., by varying the current for a laser, or mechanically, by varying the micro-electromechanical system's (MEMS) mirror to vary the wavelength. The dither modulation frequency is on the order of a few kilohertz (kHz) but may range to the Megahertz range. Preferably, the dither modulation frequency is much less than the data rate which is typically on the order of 1-10 GHz. Modulation of the laser diode bias current 104 in this manner causes a corresponding dither in the laser center wavelength.

Modulated data is then imposed on the laser, and the optical output passes through the bandpass filter 212. Preferably, the filter 212 is designed to tap off a small amount of light 218, for example, which is incident upon a photo detector receiver device, e.g., P-I-N diode 220, and converted into an electrical feedback signal 222. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 212 to the optical network.

As the PIN diode output 222 is a relatively electric signal, the resultant feedback signal is amplified by amplifier device 224 to boost the signal strength. The amplified electric feedback signal 236 is input to a multiplier device 238 where it is combined with the original dither modulation signal 216. The cross product signal 240 that results from the multiplication of the amplified PIN diode output (feedback signal) 236 and the dither signal 216 includes terms at the sum and difference of the dither frequencies. The result is thus input to a low pass filter device 242 where it is low pass filtered and then averaged by integrator circuit 244 to produce an error signal 246 which is positive or negative depending on whether the laser center wavelength is respectively less than or greater than the center point of the bandpass filter. The error signal 246 is input to the laser bias voltage device 206 where it may be added (e.g., by an adder device, not shown) in order to correct the laser bias current 204 in the appropriate direction. In this manner, the bias current (and laser wavelength) will increase or decrease until it exactly matches the center of the filter passband. Alternately, the error signal 246 may be first converted to a digital form, prior to input to the bias voltage device.

Figure 10:
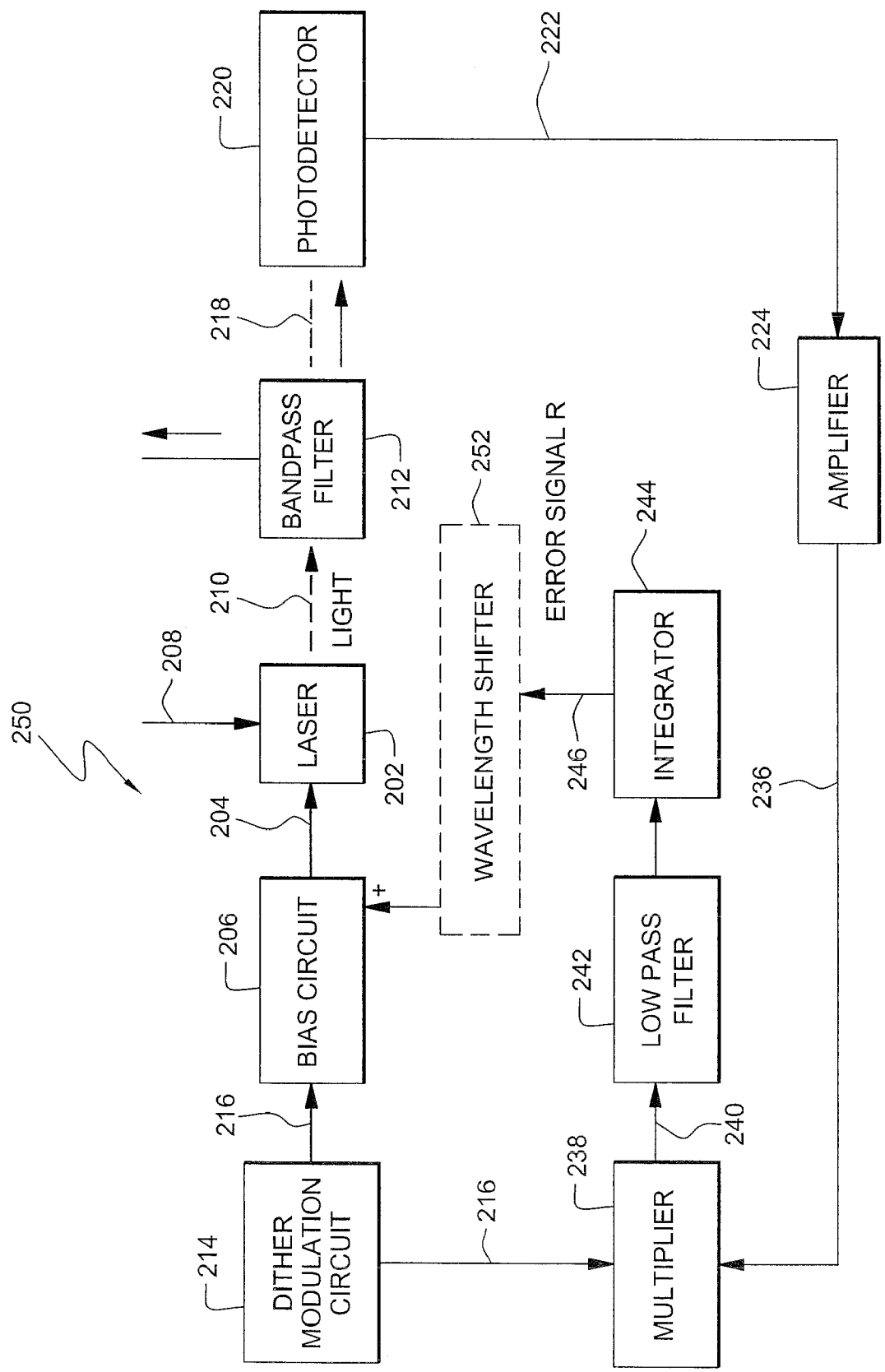

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in FIG. 10 which is a system 250 corresponding to the system 200 of FIG. 9, there is provided an optional external tuning circuit, herein referred to as a wavelength shifter device 252, that receives the error signal and varies or offsets it so that the laser center wavelength may be shifted or offset in a predetermined manner according to a particular network application. That is, the wavelength shifter 252 allows some external input, e.g., a manual control element such as a knob, to introduce an arbitrary, fixed offset between the laser center wavelength and the filter peak.

Figure 11:
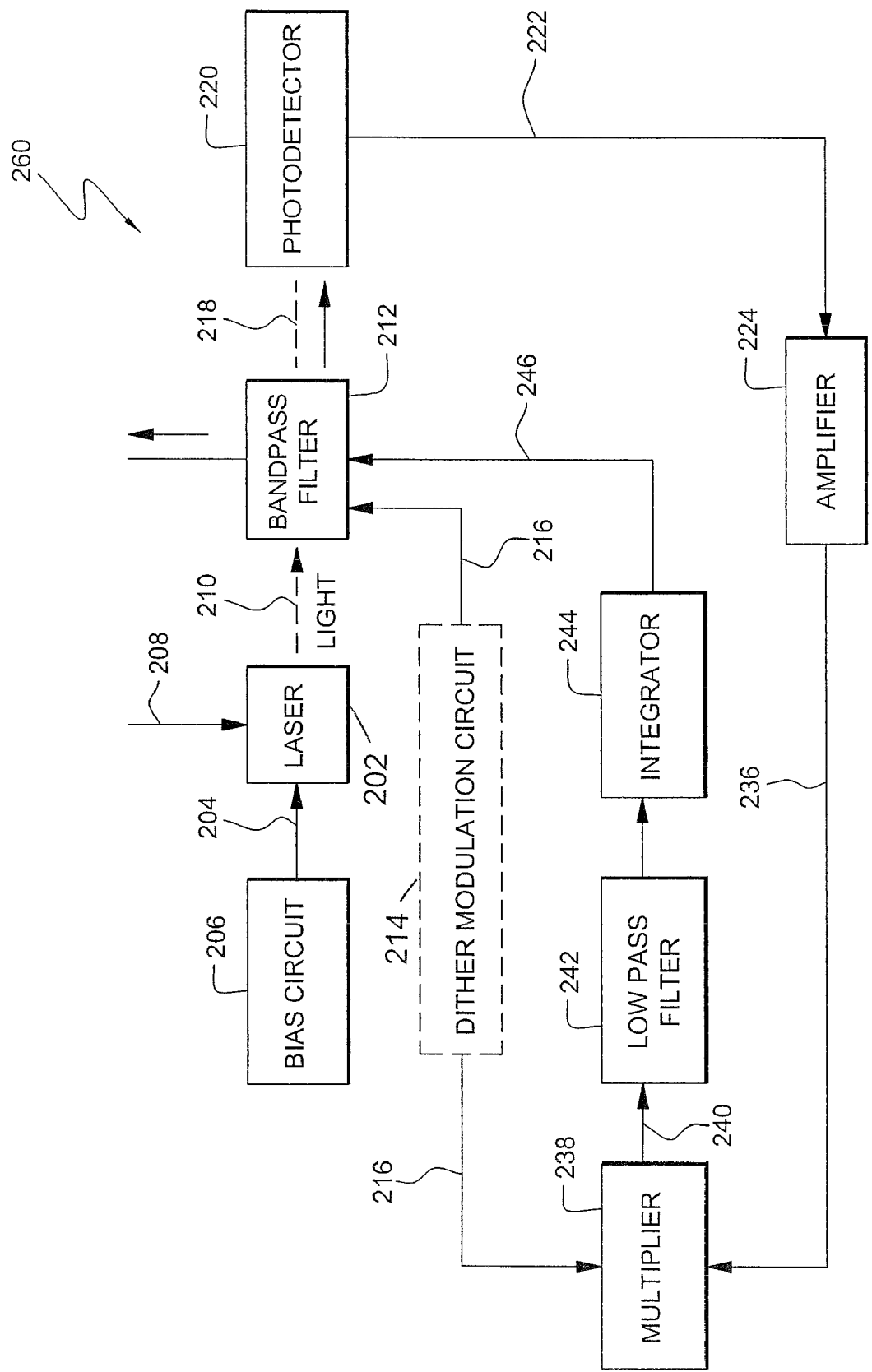
FIG. 11 is a general block diagram depicting the underlying system architecture for tuning tunable frequency selective devices such as a band pass filter that may be used in the implementation of this invention.

It should be understood that, as described in commonly-owned, co-pending U.S. patent application Ser. No. 09/865, 256, the WLL servo-control system may be implemented for tuning tunable frequency selective devices such as a bandpass filter for a variety of optical network applications, including optical gain control circuits. Thus, in the embodiment depicted in FIG. 11, the system 260 comprises similar elements as system 200 (of FIG. 9) including a bias voltage generator device 206 for applying a bias signal 204 to the laser diode 202 for generating an optical signal 210 having a peaked spectrum function. This signal 210 is input to a tunable frequency selective device 212, e.g., a tunable bandpass filter. As shown in FIG. 11, however, the sinusoidal dither/driver device 214 is implemented for modulating the peak center frequency of filter pass band with a small dither signal 216.

A small amount of light 218 is tapped off the output of the filter 212 for input to the photodetector device, e.g., PIN diode 220, where the optical signal is converted to electrical signal 222, amplified by amplifier device 224, and input to the mixer device 238 which additionally receives the dither signal 216. The mixer device generates the vector cross product 240 of the amplified feedback signal 236 with the dither signal 216 and that result is low-pass filtered, and smoothed (e.g., integrated) by integrator device 244 to provide error signal 246. This error signal 246 may be a bi-polar signal and may be used to dynamically adjust the peak center frequency of the filter passband until it matches the center frequency of the laser signal input 210.

The purpose of the WLL, as described above, is to set and control a designated power level, and to apply a servo-control loop to maintain a fixed, preset reference power level across the spectrum in a DWDM network. Moreover, this WLL provides a bi-polar error signal with a unique frequency doubling signature when optimum alignment of the center of the filter bandpass is achieved.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of tracking and compensating for changes in a multi-channel, dense wavelength division multiplexing (DWDM) network, comprising
    employing a dither feedback mechanism which uses optical filters that are already part of the network for add/drop functions;
    dithering the center wavelength of each channel in use in the network about the center of a respective optical filter bandpass, and then passing each channel through its optical filter bandpass to obtain a measurement of the optical transfer function (OTF) in the network at any instant in real-time;
    generating feedback signals from said measurements; and
    using said feedback signals to adjust the network or the optical channels in the network to compensate for the changes in the optical channels;
    wherein, when the network configuration is changed by adding or dropping wavelengths, the resulting change in the OTF is tracked and said feedback signals are used to compensate for the change by adjusting the wavelengths of the optical channels in the network to maintain a defined optical transfer function in the network.

2. A method according to claim 1, wherein the feedback mechanism includes a wavelength locked loop for generating said feedback signals.

3. A method of adjusting for changes in optical signals transmitted through a multi-channel optical network, comprising:
    transmitting a set of optical signals through a network, each of the optical signals having a respective wavelength;
    tracking changes to said set of signals by dithering the center wavelengths of each of said set of signals about the center of a respective optical filter bandpass, and then passing each of the signals through its optical filter bandpass to generate filter output signals; and
    using the filter output signals to adjust the network or the set of optical signals to compensate for said changes by adjusting the wavelengths of some of the optical signals in the network to maintain a defined optical transfer function in the network.

4. A method according to claim 3, for use with an optical control monitor having a filter for adding or dropping optical signals from the network, and wherein the tracking step includes the step of passing at least some of the optical signals through the filter of the optical control monitor.

5. A method according to claim 3, further comprising the step of dropping optical signals from the network, and wherein the step of using the filter output signals includes the step of adjusting the set of optical signals or the network to compensate for the dropping of optical signals from the network.

6. A method according to claim 3, further comprising the step of adding optical signals to the network, and wherein the step of using the filter output signals includes the step of adjusting the set of optical signals or the network to compensate for the adding of optical signals to the network.

7. A method according to claim 3, wherein each of the filter output signals represents the difference between a passband wavelength of the filter and the wavelength of a respective one of the signals passed through the filter.

8. A method according to claim 3, wherein the using step includes the steps of:
    using the filter output signals to generate a power density signal representing the spectral power density of said set of optical signals; and
    using the power density signal to adjust said spectral power density in response to changes in said power density.

9. A method according to claim 3, wherein the using step includes the steps of:
    processing said filter output signals to generate a further signal proportional to the magnitude and the direction of the difference between the passband wavelength of the filter and the wavelength of one of the signals passed through the filter; and
    using said further signal to adjust the optical network or the set of optical signals to compensate for said changes in the optical spectrum.

10. A method according to claim 9, further comprising the step of dithering at least one of the optical signals at a given rate; and wherein the processing step includes the step of:
    generating an original dither reference signal at said given rate.

11. A multi-channel optical control monitor comprising:
    a receiver for receiving a set of optical signals, each of the optical signals having a respective wavelength; and
    a tracking circuit to track changes to said set of signals, including
    i) a filter having a plurality bandpass functions,
    ii) means for dithering the wavelength of each optical signal about the center of a respective optical filter bandpass, and then to pass each optical signal through its optical filter bandpass to generate filter output signals representing said changes, and
    iii) a control for using the filter output signals to make a defined adjustment to compensate for said changes by adjusting the wavelengths of the optical signals in the network to maintain a defined optical transfer function in the network.

12. An optical control monitor according to claim 11, for use with an optical network, and wherein the filter is adapted to add or drop optical signals from the network.

13. An optical control monitor according to claim 12, wherein the control makes said adjustment to compensate for the dropping of optical signals from the network.

14. An optical control monitor according to claim 12, wherein the control makes said adjustment to compensate for the adding of optical signals to the network.

15. An optical control monitor according to claim 11, wherein each of the filter output signals represents the difference between a passband wavelength of the filter and the wavelength of a respective one of the signals passed through the filter.

16. An optical control monitor according to claim 11, wherein the control includes:
   means to use the filter output signals to generate a power density signal representing the spectral power density of said set of optical signals; and
   means to use the power density signal to make the defined adjustment in response to changes in said power density.

17. An optical control monitor according to claim 11, wherein the control includes;
   a dither source for generating a dither signal; and
   a mixer for mixing the dither signal with at least one of the filter output signals.

18. A combination add unit and drop unit for a multi-channel optical network, the combination comprising:
   an add unit comprising means for transmitting a set of optical signals, each of the optical signals having a respective wavelength; and a first dither source for dithering at least one of the optical signals; and
   a drop unit comprising a receiver for receiving the set of optical signals; and
   a tracking circuit to track changes to said set of signals, the tracking circuit including
   a filter having a plurality bandpass functions,
   means for dithering the wavelength of each optical signal about the center of a respective optical filter bandpass, and then to pass each optical signal through its optical filter bandpass to generate filter output signals representing said changes, and
   a control for using the filter output signals to make a defined adjustment to compensate for said changes by adjusting the wavelengths of the optical signals in the network to maintain a defined optical transfer function in the network.

19. A combination add unit and drop unit according to claim 18, wherein the control includes:
   a second dither source for generating a dither signal; and
   a mixer for mixing the dither signal with the at least one of the filter output signals.

20. A combination according to claim 19, wherein:
   the first dither source dithers said at least one of the optical signals at a given rate; and
   the second dither source dithers the dither signal at said given rate.

* * * * *